(12) United States Patent
Wei (10) Patent No.: US 10,705,335 B2
(45) Date of Patent: Jul. 7, 2020

(54) PROJECTION SCREEN, VEHICLE-MOUNTED HEAD-UP DISPLAY AND DISPLAY ADJUSTMENT METHOD (71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 91 days.

(21) Appl. No.: 16/072,544

(22) PCT Filed: Feb. 9, 2018

(86) PCT No.: PCT/CN2018/075968
§ 371 (c)(1),
(2) Date: Jul. 25, 2018

(87) PCT Pub. No.: WO2018/157723
PCT Pub. Date: Sep. 7, 2018

(65) Prior Publication Data
US 2019/0353899 A1    Nov. 21, 2019

(30) Foreign Application Priority Data
Mar. 1, 2017    (CN) .......................... 2017 1 0117357

(51) Int. Cl.
*G03B 21/28*    (2006.01)
*G02B 27/01*    (2006.01)
(Continued)

(52) U.S. Cl.
CPC ....... *G02B 27/0101* (2013.01); *G02F 1/1334* (2013.01); *G02F 1/155* (2013.01);
(Continued)

(58) Field of Classification Search
CPC .. G03B 21/28; G03B 21/145; G03B 21/2056; G02F 1/15; G02F 1/137; G02F 1/156;
(Continued)

(56) References Cited

U.S. PATENT DOCUMENTS

2008/0049344 A1*  2/2008  DeWard ................... B60R 1/04
                                                        359/877
2010/0073773 A1   3/2010  Hotta et al.
(Continued)

FOREIGN PATENT DOCUMENTS

CN    202150007 U    2/2012
CN    103207494 A    7/2013
(Continued)

OTHER PUBLICATIONS

China Second Office Action, Application No. 201710117357.1, dated Jan. 14, 2019, 15 pps.: with English translation.
(Continued)

*Primary Examiner* — Sultan Chowdhury
(74) *Attorney, Agent, or Firm* — Armstrong Teasdale LLP (57) ABSTRACT

Embodiments of the present disclosure provide a projection screen including a transflector, and a display adjustment assembly. The transflector has a front surface that reflects projected light. The display adjustment assembly is provided on the rear surface side of the transflector and is configured to adjust transparency.

19 Claims, 4 Drawing Sheets (51) Int. Cl.
*G02F 1/1334* (2006.01)
*G02F 1/155* (2006.01)
*B60R 1/00* (2006.01)
*G03B 21/56* (2006.01)

(52) U.S. Cl.
CPC ............... *G03B 21/28* (2013.01); *B60R 1/00* (2013.01); *G02F 2201/44* (2013.01); *G03B 21/56* (2013.01)

(58) Field of Classification Search
CPC .......... G02F 1/157; G02F 1/163; G02F 1/172; G02F 1/1334; G02F 1/13318; G02B 27/017; G02B 27/0101; G02B 27/0172
See application file for complete search history.

(56) References Cited

U.S. PATENT DOCUMENTS

| | | | | |
|---|---|---|---|---|
| 2016/0147074 | A1* | 5/2016 | Kobayashi | G02B 3/0006 345/7 |
| 2016/0178905 | A1* | 6/2016 | Rider | G06F 3/0489 345/8 |
| 2017/0184894 | A1* | 6/2017 | Hayashi | H04N 9/3173 |
| 2018/0210207 | A1* | 7/2018 | Machida | G02B 6/0016 |

FOREIGN PATENT DOCUMENTS

| | | |
|---|---|---|
| CN | 103246102 A | 8/2013 |
| CN | 103412434 A | 11/2013 |
| CN | 103873843 A | 6/2014 |
| CN | 104691413 A | 6/2015 |
| CN | 105103033 A | 11/2015 |
| CN | 205044483 U | 2/2016 |
| CN | 105974589 A | 9/2016 |
| CN | 106646889 A | 5/2017 |
| FR | 2681702 A1 | 3/1993 |

OTHER PUBLICATIONS

PCT International Search Report, Application No. PCT/CN2018/075968, dated May 2, 2018, 8 pages: with English translation.
PCT Written Opinion, Application No. PCT/CN2018/075968, dated May 2, 2018, 6 pages.: with English translation of relevant part.
China First Office Action, Application No. 201710117357.1, dated Aug. 1, 2018, 18 pps.: with English translation.
China Rejection Decision, Application No. 201710117357.1, dated Feb. 3, 2020, 13 pps.: with English translation.

* cited by examiner

Control the display adjustment assembly so as to adjust transparency

FIG. 11

PROJECTION SCREEN, VEHICLE-MOUNTED HEAD-UP DISPLAY AND DISPLAY ADJUSTMENT METHOD

CROSS REFERENCE TO RELATED APPLICATIONS

This patent application is a National Stage Entry of PCT/CN2018/075968 filed on Feb. 9, 2018, which claims the benefit and priority of Chinese Patent Application No. 201710117357.1 filed on Mar. 1, 2017, the disclosures of which are incorporated herein by reference in their entirety as part of the present application.

BACKGROUND

The present disclosure relates to the field of vehicle-mounted head-up displays, and in particular, to a projection screen, a vehicle-mounted head-up display, and a display adjustment method.

At present, with the rapid development of smart devices for vehicles, vehicle-mounted head-up displays are gradually being focused. A driver can conveniently view information about road conditions and meters projected by a projection device through a vehicle-mounted head-up display, without having to look down at other electronic devices or vehicle-mounted meters, thereby effectively improving driving safety. However, the display effect of an existing vehicle-mounted head-up display is greatly affected by environmental factors. For example, in special weather such as fog, snow, rain, or wind, changes in the external environment may affect the display effect of the display, resulting in unclear display content, which is hard for the driver to view.

BRIEF DESCRIPTION

The present disclosure provides a projection screen, a vehicle-mounted head-up display, and a display adjustment method.

According to a first aspect, an embodiment of the present disclosure provides a projection screen including a transflector, and a display adjustment assembly. The transflector has a front surface that reflects projected light. The display adjustment assembly is provided on a rear surface side of the transflector and is configured to adjust transparency.

In an embodiment of the present disclosure, the display adjustment assembly includes at least one of an electrochromic member and an electrically controlled dimming member. The electrochromic member is configured to switch between a faded state and a colored state. The electrically controlled dimming member is configured to switch between a transparent state and a foggy state.

In an embodiment of the present disclosure, the display adjustment assembly includes an electrochromic member and an electrically controlled dimming member. The electrochromic member is located between the transflector and the electrically controlled dimming member.

In an embodiment of the present disclosure, the electrochromic member includes a first electrode layer, an electrochromic material layer, and a second electrode layer which are layered. The electrically controlled dimming member includes an electrically controlled dimming material layer and a third electrode layer which are layered. The second electrode layer is further configured to cooperate with the third electrode layer to control the electrically controlled dimming material layer.

In an embodiment of the present disclosure, the electrochromic member includes a first electrode layer and an electrochromic material layer which are layered. The electrically controlled dimming member includes a second electrode layer, an electrically controlled dimming material layer, and a third electrode layer which are layered. The second electrode layer is further configured to cooperate with the first electrode layer to control the electrochromic material layer.

In an embodiment of the present disclosure, a transparent substrate is provided between the electrochromic member and the electrically controlled dimming member.

In an embodiment of the present disclosure, a transparent substrate is provided between the transflector and the electrochromic member.

In an embodiment of the present disclosure, the electrochromic member exhibits a black color in a colored state.

In an embodiment of the present disclosure, the electrically controlled dimming member includes polymer dispersed liquid crystal as an electrically controlled dimming material.

In an embodiment of the present disclosure, the front surface of the transflector is a concave surface.

According to a second aspect, an embodiment of the present disclosure provides a vehicle-mounted head-up display including the projection screen of any of the above, and a projection device. The projection device is configured to project light onto the projection screen.

According to a third aspect, an embodiment of the present disclosure provides a display adjustment method applied to the above-described projection screen, the method including controlling a display adjustment assembly so as to change transparency.

In an embodiment of the present disclosure, the display adjustment assembly includes at least one of an electrochromic member and an electrically controlled dimming member. The step of controlling the display adjustment assembly so as to change transparency includes at least one of the following steps: controlling the electrochromic member to switch between a faded state and a colored state, and controlling the electrically controlled dimming member to switch between a transparent state and a foggy state.

BRIEF DESCRIPTION OF THE DRAWINGS

In order to illustrate the technical solutions of the embodiments of the present disclosure more clearly, the drawings of the embodiments will be briefly described below, and it should be appreciated that the drawings described below are only related to some of the embodiments of the present disclosure, rather than limiting the present disclosure, in which.

DETAILED DESCRIPTION

The specific embodiments of the present disclosure will be described in detail below with reference to the drawings, but it should be understood that the present disclosure is not limited thereto.

It should be understood that various modifications may be made to the embodiments disclosed herein. Therefore, the description should not be taken as limiting, but merely as an example of the embodiments. Other modifications within the scope and spirit of the present disclosure will occur to those skilled in the art.

The accompanying drawings, which are incorporated in the description and constitute a part of the description, illustrate the embodiments of the present disclosure, and are used together with a general description of the present disclosure given above and a detailed description of the embodiments given below, to explain the principles of the present disclosure.

These and other features of the present disclosure will become apparent from the following description of the forms of the embodiments given as non-limiting examples with reference to the drawings.

It should also be understood that, although the present disclosure has been described with reference to some specific examples, those skilled in the art can explicitly implement many other equivalent forms of the present disclosure, which have the features described by the claims and therefore fall within the scope of protection claimed.

When the accompanying drawings are combined, in view of the following detailed description, the above and other aspects, features and advantages of the present disclosure will become more apparent.

Specific embodiments of the present disclosure are described below with reference to the drawings; however, it should be understood that the disclosed embodiments are only examples of the present disclosure, which can be implemented in various ways. The well-known and/or repeated functions and structures are not described in detail to avoid unnecessary or excessive details which cause the present disclosure ambiguous. Therefore, specific structural and functional details disclosed herein are not intended to be limiting, but are merely used as a basis of the claims and a representative basis to teach those skilled in the art to use the present disclosure in any substantially suitable detailed structure in diverse ways.

The description may use the phrases "in an embodiment", "in another embodiment", "in yet another embodiment" or "in other embodiments", which may refer to one or more of identical or different embodiments according to the present disclosure.

Specifically, the embodiments of the present disclosure provide a projection screen, a vehicle-mounted head-up display, and a display adjustment method that can be not affected by outside weather when the weather conditions are not good.

Figure 1:
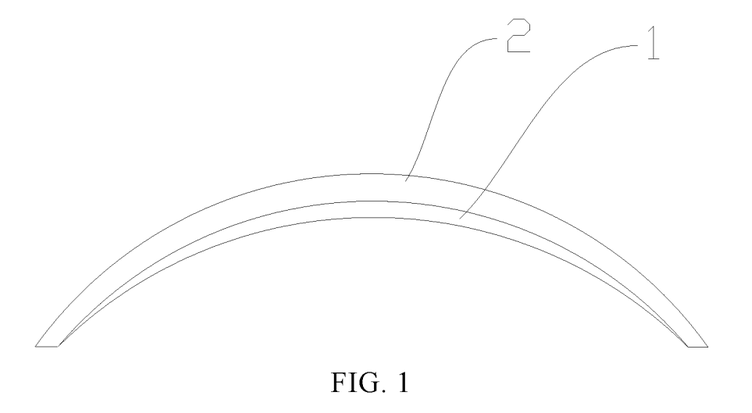
FIG. 1 is a schematic structural diagram of a projection screen in an embodiment of the present disclosure.

Specifically, FIG. 1 is a schematic structural diagram of a projection screen in an embodiment of the present disclosure. As shown in FIG. 1, the projection screen includes a transflector 1, and a display adjustment assembly 2. The transflector 1 has a front surface that reflects projected light. The transflector 1 is configured to reflect light projected onto the projection screen to the user. The display adjustment assembly 2 is provided on the rear surface side of the transflector 1 and is configured to adjust transparency. The front surface of the transflector 1 facing the user may be a concave surface so as to provide a focusing effect and present a sufficiently large image which is convenient for the driver to view.

In weather conditions affecting vision, such as rain or snow or fog, the information displayed on the transflector 1 may be unclear as being affected by external weather. The embodiment of the present disclosure can adjust transparency through the display adjustment assembly 2 so as to reduce the influence of external light, and help the user to view data information displayed on the transflector 1.

In an embodiment of the present disclosure, the display adjustment assembly includes at least one of an electrochromic member and an electrically controlled dimming member. The electrochromic member is configured to switch between a faded state and a colored state. The electrically controlled dimming member is configured to switch between a transparent state and a foggy state.

The electrochromic member can exhibit various colors in a colored state. In order to achieve a better display effect, the following description is given by example of a black color. The specific electrochromic material can be selected from various materials such as polyaniline, viologen, tungsten oxide, and titanium dioxide.

The electrically controlled dimming member can use polymer dispersed liquid crystal (PDLC) as an electrically controlled dimming material.

Figure 2:
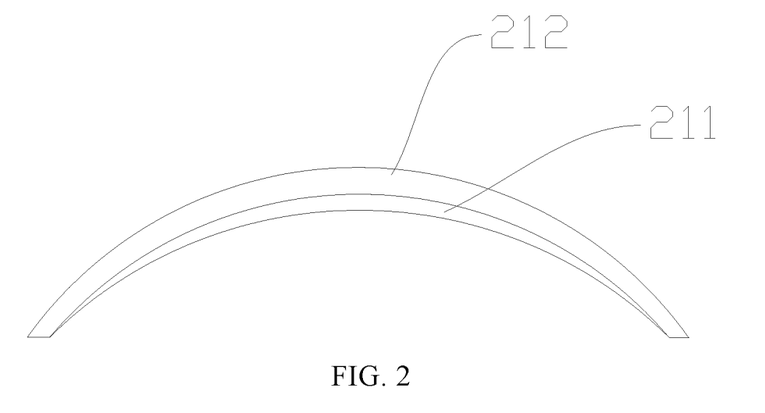
FIG. 2 is a schematic structural diagram of an electrochromic member according to an embodiment of the present disclosure.

FIG. 2 is a schematic structural diagram of an electrochromic member according to an embodiment of the present disclosure.

As shown in FIG. 2, the display adjustment assembly 2 may include an electrochromic member 21 which is switchable between a faded state exhibiting a transparent color and a colored state exhibiting a black color according to the effect of an electric field. It can be understood that the electrochromic member 21 can be converted into a transparent color when an electric field is applied and converted into a black color when no electric field is applied. Conversely, it can be converted into a black color when an electric field is applied and converted into a transparent color when no electric field is applied. Further, the electric field applied may be an external electric field applied to the display adjustment assembly 2, or an electric field applied by an electrode arranged in the display adjustment assembly 2. The following embodiments are described in such a manner that an electric field is applied by an electrode arranged in the display adjustment assembly 2, without limitation.

Figure 3:
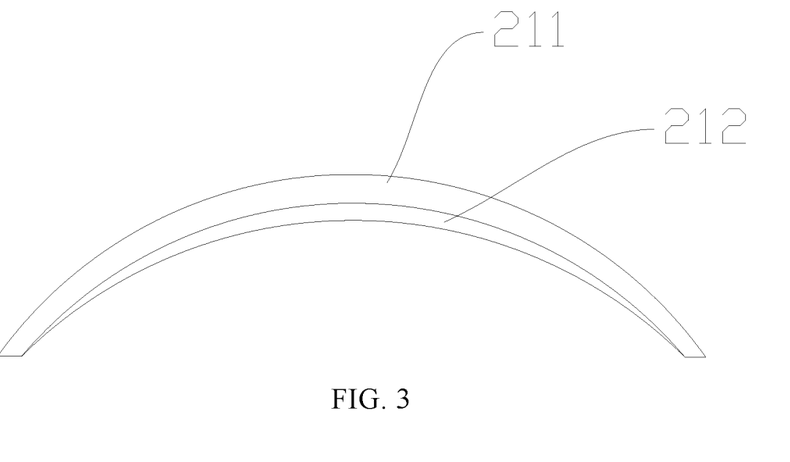
FIG. 3 is a schematic structural diagram of an electrochromic member according to another embodiment of the present disclosure.
Figure 4:
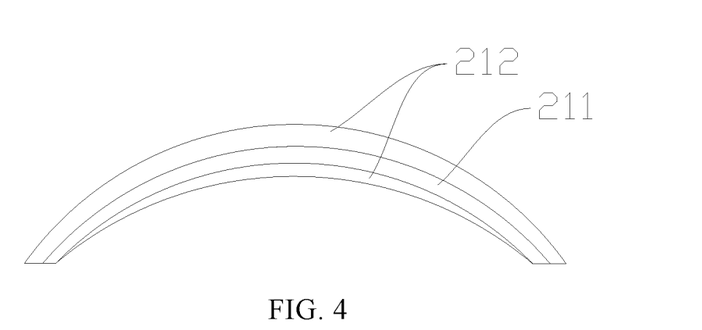
FIG. 4 is a schematic structural diagram of an electrochromic member according to yet another embodiment of the present disclosure.

FIG. 2 is a schematic structural diagram of an electrochromic member according to an embodiment of the present disclosure, FIG. 3 is a schematic structural diagram of an electrochromic member according to another embodiment of the present disclosure, and FIG. 4 is a schematic structural diagram of an electrochromic member according to yet another embodiment of the present disclosure.

The electrochromic member 21 may include an electrochromic material layer 211, and an electrode layer 212 provided on at least one side of two sides of the electrochromic material layer 211.

As shown in FIGS. 2 and 3, the electrode layer 212 is provided on one of the two sides of the electrochromic material layer 211, and an electric field can be applied to the electrochromic material layer 211 through the electrode layer 212 by supplying electric power to the electrode layer 212, so as to cause the electrochromic material layer 211 to switch between a transparent color and a black color. As in the present embodiment, an electric field can be applied to the electrochromic material layer 211 by supplying electric power to the electrode layer 212 such that the electrochromic material layer 211 is converted into a black color. Accordingly, when the electrode layer 212 is electrically disconnected, the electric field applied to the electrochromic material layer 211 is eliminated, so that the electrochromic material layer 211 is converted from a black color into a transparent color.

In the embodiment shown in FIG. 4, electrode layers 212 are respectively provided on two sides of the electrochromic material layer 211, and the electric field applied to the electrochromic material layer 211 is changed by supplying electric power to the two electrode layers 212, thereby causing the electrochromic material layer 211 to switch between a black color and a transparent color. Also, in the embodiment of the present disclosure, an electric field can be applied to the electrochromic material layer 211 by supplying electric power to the electrode layers 212 such that the electrochromic material layer 211 is converted into a black color. Accordingly, when the electrode layers 212 are electrically disconnected, the electric field applied to the electrochromic material layer 211 is eliminated, such that the electrochromic material layer 211 is converted from a black color into a transparent color.

Figure 5:
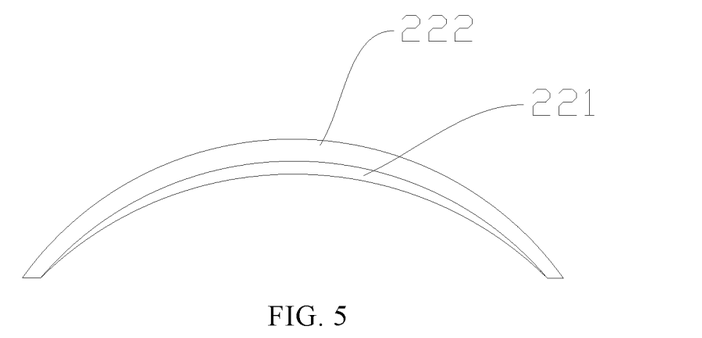
FIG. 5 is a schematic structural diagram of an electrically controlled dimming member according to an embodiment of the present disclosure.
Figure 6:
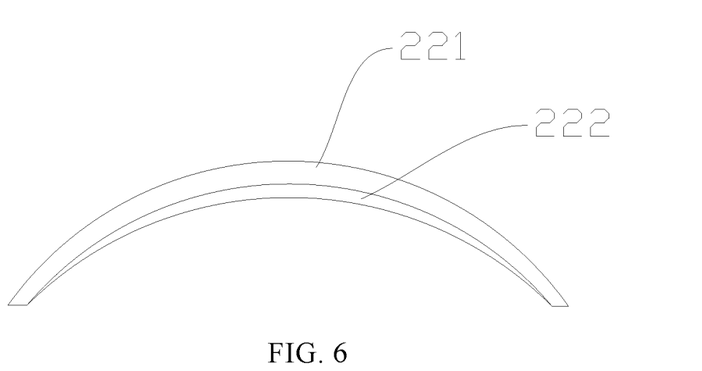
FIG. 6 is a schematic structural diagram of an electrically controlled dimming member according to another embodiment of the present disclosure.
Figure 7:
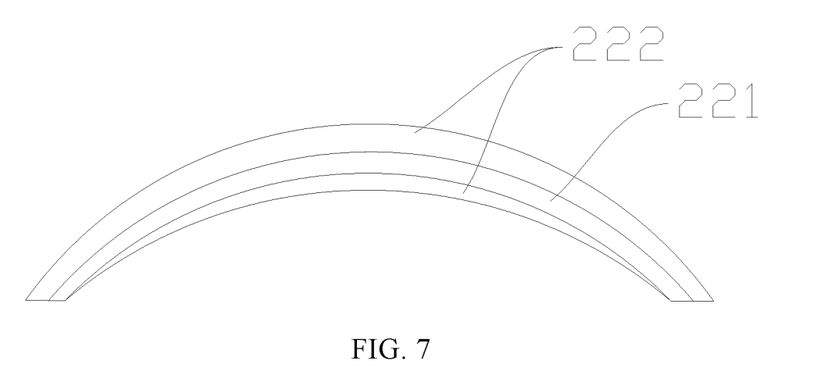
FIG. 7 is a schematic structural diagram of an electrically controlled dimming member according to yet another embodiment of the present disclosure.

FIG. 5 is a schematic structural diagram of an electrically controlled dimming member according to an embodiment of the present disclosure, FIG. 6 is a schematic structural diagram of an electrically controlled dimming member according to another embodiment of the present disclosure, and FIG. 7 is a schematic structural diagram of an electrically controlled dimming member according to yet another embodiment of the present disclosure.

The electrically controlled dimming member 22 in the embodiment of the present disclosure may include an electrically controlled dimming material layer (e.g. PDLC layer) 221, and an electrode layer 222 provided on at least one side of two sides of the PDLC layer 221.

As shown in FIGS. 5 and 6, the electrode layer 222 is provided on one side of the two sides of the PDLC layer 221, and an electric field can be applied to the PDLC layer 221 through the electrode layer 222 by supplying electric power to the electrode layer 222 so as to cause the PDLC layer to switch between a transparent state and a foggy state. As in the present embodiment, an electric field can be applied to the PDLC layer 221 by supplying electric power to the electrode layer 222 such that the PDLC layer 221 is converted into a foggy state. Accordingly, when the electrode layer 222 is electrically disconnected, the electric field applied to the PDLC layer 221 is eliminated, such that the PDLC layer is converted from a foggy state to a transparent state.

As shown in FIG. 7, an electrode layer 222 is provided on each side of the two sides of the PDLC layer 221, and an electric field applied to the PDLC layer 221 can be changed by supplying electric power to the two electrode layers 222 so as to cause the electrochromic material layer to switch between a foggy state and a transparent state. Also, in the embodiment of the present disclosure, an electric field can be applied to the PDLC layer 221 by supplying electric power to the electrode layers 222 such that the PDLC layer 221 is converted into a foggy state. Accordingly, when the electrode layers 222 are electrically disconnected, the electric field applied to the PDLC layer 221 is eliminated, such that the electrochromic material layer is converted from a foggy state to a transparent state.

In an embodiment of the present disclosure, the display adjustment assembly 2 may include both the electrochromic member 21 and the electrically controlled dimming member 22. Further, the electrochromic member 21 may be located between the transflector 1 and the electrically controlled dimming member 22. That is, the transflector 1, the electrochromic member 21, and the electrically controlled dimming member 22 may be provided in turn in a layered manner. It should be understood that the transflector 1, the electrically controlled dimming member 22, and the electrochromic member 21 may also be provided in turn in a layered manner.

By applying electric fields to the electrochromic member 21 and the electrically controlled dimming member 22 respectively, the electrochromic member 21 can be converted into a black color and the electrically controlled dimming member 22 can be converted into a foggy state, such that the foggy state of the electrically controlled dimming member deepens the black color of the electrochromic member, further improving the display clarity of the transflector 1.

Figure 8:
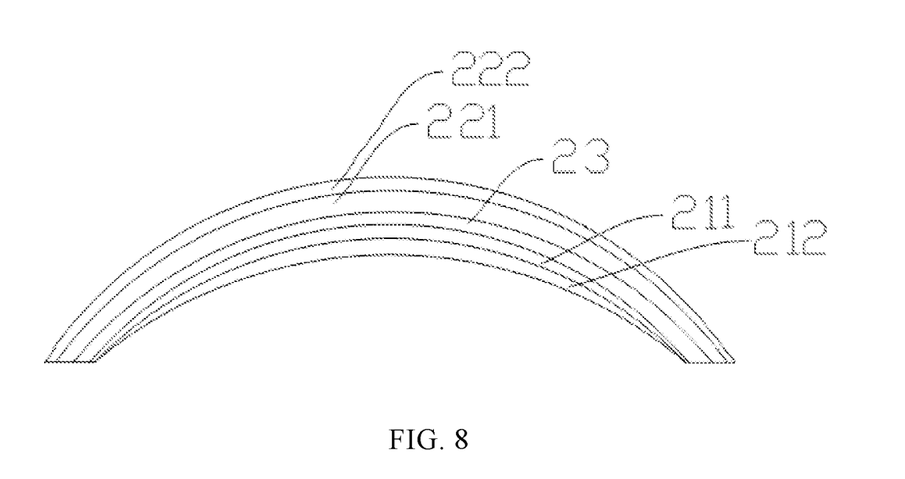
FIG. 8 is a schematic structural diagram of a projection screen according to another embodiment of the present disclosure.

FIG. 8 is a schematic structural diagram of a projection screen according to another embodiment of the present disclosure.

As shown in FIG. 8, the electrically controlled dimming member 22 and the electrochromic member 21 may share a single electrode layer 23.

Specifically, the shared electrode layer 23 may belong to the electrochromic member 21. The electrochromic member 21 includes a first electrode layer 212, an electrochromic material layer 211, and a second electrode layer 23 which are layered. The electrically controlled dimming member 22 includes an electrically controlled dimming material layer 221 and a third electrode layer 222 which are layered. The second electrode layer 23 is further configured to cooperate with the third electrode layer 222 to control the electrically controlled dimming material layer 221.

Furthermore, the shared electrode layer 23 can also belong to the electrically controlled dimming member 22. The electrochromic member 21 includes a first electrode layer 212 and an electrochromic material layer 211 which are layered. The electrically controlled dimming member 22 includes a second electrode layer 23, an electrically controlled dimming material layer 221, and a third electrode layer 222 which are layered. The second electrode layer 23 is further configured to cooperate with the first electrode layer 212 to control the electrochromic material layer 211.

In the above manner, the electrochromic member 21 and the electrically controlled dimming member 22 can share a single electrode layer 23 located therebetween so as to reduce process difficulties and costs. The shared second electrode layer 23 may be a common electrode.

Furthermore, the electrochromic material layer 211 in the electrochromic member 21 and the PDLC layer 221 in the electrically controlled dimming member 22 may each include a plurality of layers.

Figure 9:
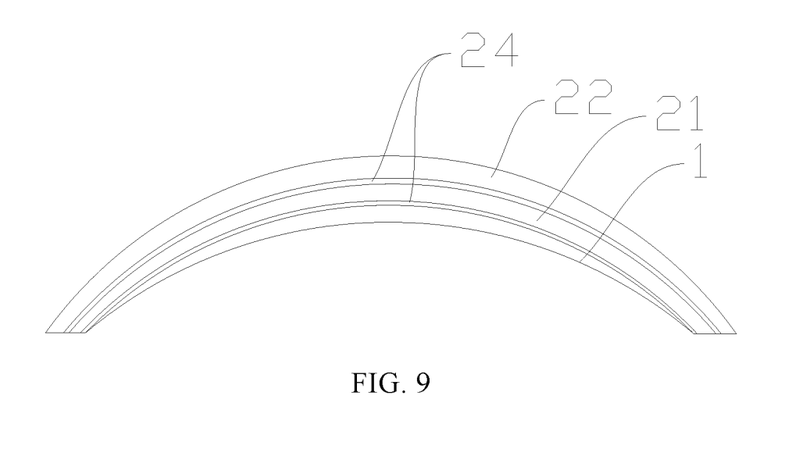
FIG. 9 is a schematic structural diagram of a projection screen according to yet another embodiment of the present disclosure.

FIG. 9 is a schematic structural diagram of a projection screen according to yet another embodiment of the present disclosure.

In addition, in the embodiment shown in FIG. 9, a substrate layer 24 may be provided between the electrically controlled dimming member 22 and the electrochromic member 21 in the embodiment of the present disclosure, and/or between the electrochromic member 21 and the transflector 1, and the substrate layer may be made of a transparent material such as a plastic material. By providing the substrate layer 24, the structure of the projection screen can be reinforced, and the electric field intensity generated inside each of the electrically controlled dimming member 22 and the electrochromic material layer 21 can be isolated to reduce mutual influence.

Figure 10:
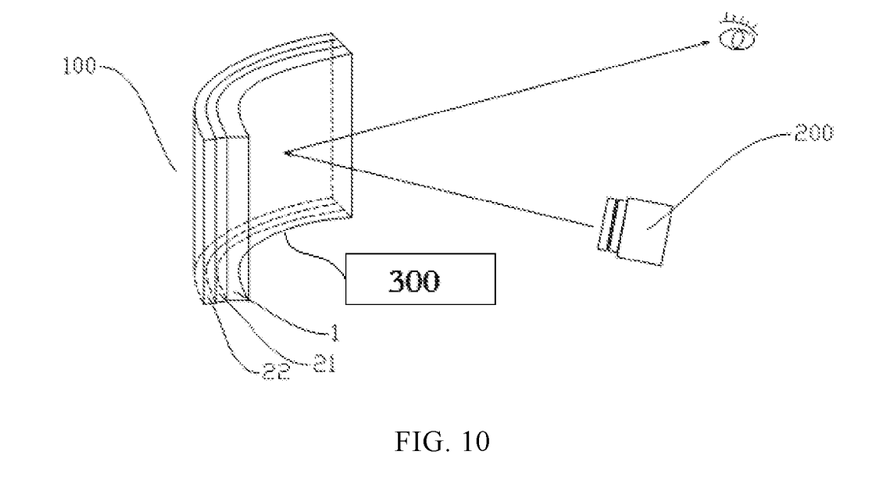
FIG. 10 is a schematic structural diagram of a vehicle-mounted head-up display according to an embodiment of the present disclosure.

FIG. 10 is a schematic structural diagram of a vehicle-mounted head-up display according to an embodiment of the present disclosure.

As shown in FIG. 10, an embodiment of the present disclosure provides a vehicle-mounted head-up display including a projection screen 100 as described in the above embodiments, and a projection device 200. The projection device 200 is configured to project light onto the projection screen 100. The projection screen 100 is configured to be capable of displaying information projected by the projection device 200. In a specific embodiment, the in-vehicle information that is required to be displayed may be transmitted to the projection device 200 for transmission to the projection screen 100 through the projection device 200 for display.

The vehicle-mounted head-up display may include a projection screen control portion 300, and the projection screen control portion 300 may be used to control the display adjustment assembly 2 in the projection screen 100, that is, may control the powering-on/powering-off of the electrode layers within the electrochromic member 21 and the electrically controlled dimming member 22, so as to adjust the degree of light transmission and/or color of the display adjustment assembly 2.

Figure 11:
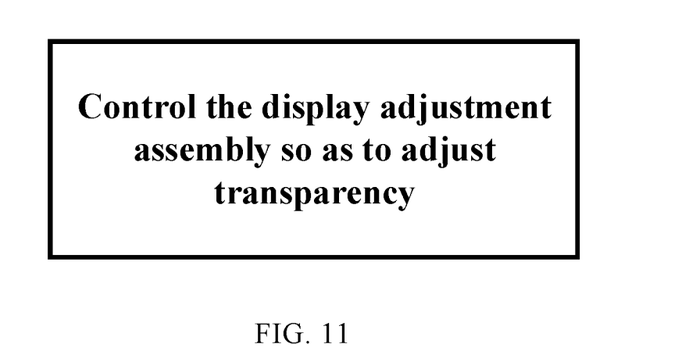
FIG. 11 is a principle structural diagram of a display adjustment method according to an embodiment of the present disclosure.

FIG. 11 is a principle structural diagram of the display adjustment method according to an embodiment of the present disclosure.

An embodiment of the present disclosure provides a display adjustment method applied to the above-described projection screen, the method including controlling a display adjustment assembly to adjust transparency.

In the embodiment of the present disclosure, the display adjustment assembly 2 includes at least one of the electrochromic member 21 and the electrically controlled dimming member 22. The step of controlling the display adjustment assembly 2 to adjust transparency includes at least one of the following steps: controlling the electrochromic member 21 to switch between a faded state and a colored state, and controlling the electrically controlled dimming member 22 to switch between a transparent state and a foggy state.

In the embodiment of the present disclosure, since the degree of light transmission and/or color of the display adjustment assembly can be changed by controlling the state of the display adjustment assembly, the image information presented by the transflector 1 can be not affected by the influence of the external environment when the background outside the vehicle makes the vision not good.

The above embodiments are merely exemplary embodiments of the present disclosure, and are not intended to limit the present disclosure, and the scope of protection of the present disclosure is defined by the claims. Those skilled in the art can make various modifications or equivalent substitutions to the present disclosure within the spirit and scope of the present disclosure, and such modifications or equivalent substitutions are also considered to fall within the scope of protection of the present disclosure.

What is claimed is:

1. A projection screen (100) comprising:
   a transflector (1) having a front surface that reflects projected light; and
   a display adjustment assembly (2) provided on a rear surface side of the transflector (1) and configured to adjust transparency;
   wherein the display adjustment assembly (2) comprises at least one of an electrochromic member (21) and an electrically controlled dimming member (22);
   wherein the electrochromic member (21) comprises at least one electrode layer (212), and an electrochromic material layer (211) which are layered;
   wherein the electrically controlled dimming member (22) comprises an electrically controlled dimming material layer (221) and at least one electrode layer (222) which are layered;
   wherein the electrochromic material layer (211) of the electrochromic member (21) is configured to switch between a faded state and a colored state, based on a voltage applied to the at least one electrode layer (212) of the electrochromic member (21); and
   wherein the electrically controlled dimming material layer (221) of the electrically controlled dimming member (22) is configured to switch between a transparent state and a foggy state, based on a voltage applied to the at least one electrode layer (222) of the electrically controlled dimming member (22).

2. The projection screen (100) according to claim 1,
   wherein the display adjustment assembly (2) comprises the electrochromic member (21) and the electrically controlled dimming member (22); and
   wherein the electrochromic member (21) is located between the transflector al and the electrically controlled dimming member (22).

3. The projection screen (100) according to claim 2,
   wherein the electrochromic member (21) comprises a first electrode layer (212), an electrochromic material layer (211), and a second electrode layer (23) which are layered;
   wherein the electrically controlled dimming member (22) comprises an electrically controlled dimming material layer (221) and a third electrode layer (222) which are layered; and
   wherein the second electrode layer (23) is further configured to cooperate with the third electrode layer (222) to control the electrically controlled dimming material layer (221).

4. The projection screen (100) according to claim 2,
   wherein the electrochromic member (21) comprises a first electrode layer (212) and an electrochromic material layer (211) which are layered;
   wherein the electrically controlled dimming member (22) comprises a second electrode layer (23), an electrically controlled dimming material layer (221), and a third electrode layer (222) which are layered; and wherein the second electrode layer (23) is further configured to cooperate with the first electrode layer (212) to control the electrochromic material layer (211).

5. The projection screen (100) according to claim 2, wherein a transparent substrate (24) is provided between the electrochromic member (21) and the electrically controlled dimming member (22).

6. The projection screen (100) according to claim 2, wherein a transparent substrate (24) is provided between the transflector and the electrochromic member (21).

7. The projection screen (100) according to claim 1, wherein the electrochromic member (21) exhibits a black color in a colored state.

8. The projection screen (100) according to claim 1, wherein the electrically controlled dimming member (22) comprises polymer dispersed liquid crystal (221) as an electrically controlled dimming material (221).

9. The projection screen (100) according to claim 1, wherein the front surface of the transflector al is a concave surface.

10. A vehicle-mounted head-up display comprising the projection screen (100) of claim 1, and a projection device (200), wherein the projection device (200) is configured to project light onto the projection screen (100).

11. A display adjustment method applied to the projection screen (100) according to claim 1, the method comprising:
controlling the display adjustment assembly (2) so as to adjust transparency.

12. The method according to claim 11,
wherein the display adjustment assembly (2) comprises at least one of an electrochromic member (21) and an electrically controlled dimming member (22); and
wherein the step of controlling the display adjustment assembly a so as to adjust transparency comprises at least one of:
controlling the electrochromic member (21) to switch between a faded state and a colored state; and
controlling the electrically controlled dimming member (22) to switch between a transparent state and a foggy state.

13. The vehicle-mounted head-up display according to claim 10,
wherein the display adjustment assembly (2) comprises at least one of an electrochromic member (21) and an electrically controlled dimming member (22);
wherein the electrochromic member (21) is configured to switch between a faded state and a colored state; and
wherein the electrically controlled dimming member (22) is configured to switch between a transparent state and a foggy state.

14. The vehicle-mounted head-up display according to claim 13,
wherein the display adjustment assembly (2) comprises the electrochromic member (21) and the electrically controlled dimming member (22); and
wherein the electrochromic member (21) is located between the transflector (1) and the electrically controlled dimming member (22).

15. The vehicle-mounted head-up display according to claim 14,
wherein the electrochromic member (21) comprises a first electrode layer (212), an electrochromic material layer (211), and a second electrode layer (23) which are layered;
wherein the electrically controlled dimming member (22) comprises an electrically controlled dimming material layer (221) and a third electrode layer (222) which are layered; and
wherein the second electrode layer (23) is further configured to cooperate with the third electrode layer (222) to control the electrically controlled dimming material layer (221).

16. The vehicle-mounted head-up display according to claim 14,
wherein the electrochromic member (21) comprises a first electrode layer (212) and an electrochromic material layer (211) which are layered;
wherein the electrically controlled dimming member (22) comprises a second electrode layer (23), an electrically controlled dimming material layer (221), and a third electrode layer (222) which are layered; and
wherein the second electrode layer (23) is further configured to cooperate with the first electrode layer (212) to control the electrochromic material layer (211).

17. The vehicle-mounted head-up display according to claim 14,
wherein a transparent substrate (24) is provided between the electrochromic member (21) and the electrically controlled dimming member (22).

18. The vehicle-mounted head-up display according to claim 14,
wherein a transparent substrate (24) is provided between the transflector (1) and the electrochromic member (21).

19. The vehicle-mounted head-up display according to claim 13,
wherein the electrochromic member (21) exhibits a black color in a colored state.

* * * * *

UNITED STATES PATENT AND TRADEMARK OFFICE
CERTIFICATE OF CORRECTION

PATENT NO. : 10,705,335 B2
APPLICATION NO. : 16/072544
DATED : July 7, 2020
INVENTOR(S) : Wei Wei Page 1 of 1

It is certified that error appears in the above-identified patent and that said Letters Patent is hereby corrected as shown below:

In the Claims

Claim 2, Column 8, Line 45, delete "transflector al and" and insert therefor -- transflector (1) and --.
Claim 9, Column 9, Line 19, delete "transflector al is" and insert therefor -- transflector (1) is --.
Claim 12, Column 9, Line 34, delete "assembly a so" and insert therefor -- assembly (2) so --.

Signed and Sealed this
Twenty-ninth Day of December, 2020

Andrei Iancu
*Director of the United States Patent and Trademark Office*